B. B. HOTCHKISS.
Metallic Cartridge-Cases.

No. 158,494.
Patented Jan. 5, 1875.

Witnesses:
Arnold Hormann
Wm. C. Dey

Inventor:
B. B. Hotchkiss
by his atty T. D. Stetson
New York City

UNITED STATES PATENT OFFICE.

BENJAMIN B. HOTCHKISS, OF NEW YORK, N. Y.

IMPROVEMENT IN METALLIC CARTRIDGE-CASES.

Specification forming part of Letters Patent No. 158,494, dated January 5, 1875; application filed February 23, 1874.

*To all whom it may concern:*

Be it known that I, B. B. HOTCHKISS, of New York city, in the State of New York, temporarily residing in Paris, France, have invented certain Improvements relating to Cartridge-Cases, of which the following is a specification:

My improved cartridge-case is particularly adapted for cartridges for cannon of large caliber. It overcomes some of the difficulties hitherto experienced in the adaptation of metallic cartridge-cases thereto. It may be used, however, of much smaller size in other arms.

I take tinned sheet-iron or other suitable thin metal, and, bending it around, form a tube by joining the edges by soldering or other means. This tube is turned in at one end, and to the turned-in portion I attach one or more strengthening-cups, serving at the same time to strengthen the rear portion of the cartridge, and to serve as a gas-check. In what I esteem the most universally complete form of the invention I employ three such strengthening-cups, each differing a little in depth from either of the others. I mount these, one on the outside of the tube, and two on the inside. I secure the whole strength to a disk, which extends across the rear, having perforations, which do not coincide with certain perforations in the strengthening-cups.

The accompanying drawings form a part of this specification, and represent what I esteem the best form, and also two modifications.

Figure 1:
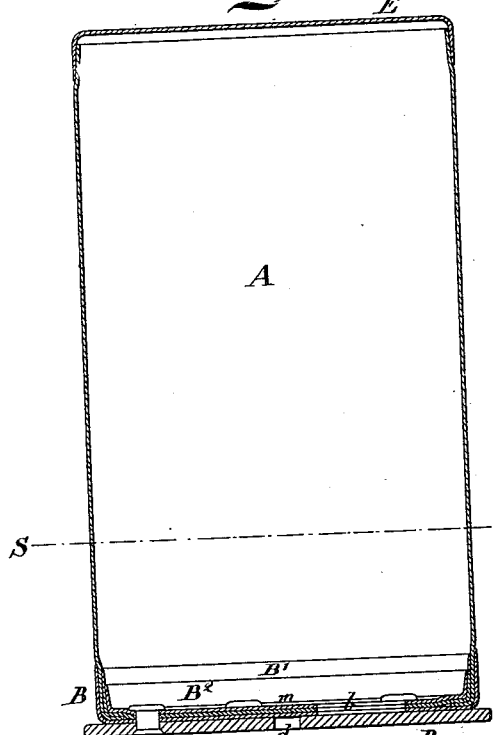
Figure 2:
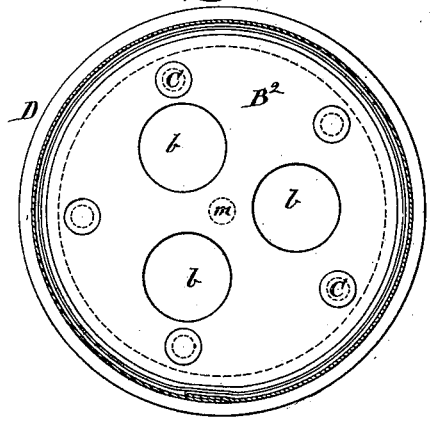

Figure 1 is a central longitudinal section through the entire cartridge-case. Fig. 2 is a section on the line S S, as seen from the top, which will, in use, be the front of the cartridge.

Figure 3:
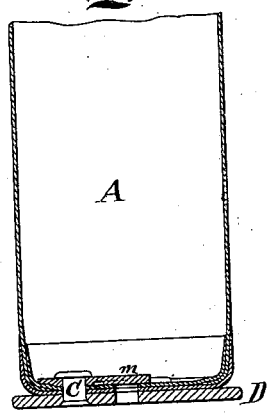
Figure 4:
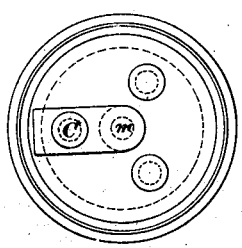

These figures show what I esteem the generally preferable construction; but Figs. 3 and 4 are corresponding views of one which is preferable for some reasons. In this form the hole in the center of the disk coincides or is exactly in line with a corresponding hole in the center of the cups. The continuous hole thus formed through the entire rear of the cartridge is covered on the inner face by a separate valve.

Figure 5:
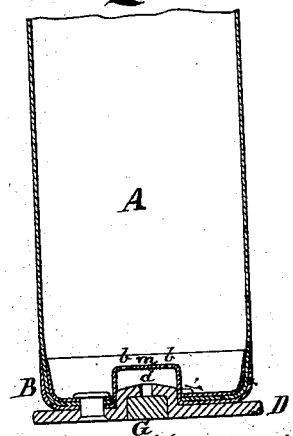

Fig. 5 is a central longitudinal section of the rear portion of my cartridge, constructed according to another modification. In this the one cup is raised and forced inward a good deal near the center, but adapted to be crushed back by the force of the discharge, substantially like a valve. Small perforations therein allow the fire to enter freely. The disk is forced inward near the center, but to a less extent and over a smaller area. Cartridges having this modification may be made self-priming by carrying fulminate and an anvil, and in either use will serve as a valve-backed cartridge.

I will describe particularly the first and principal form, shown in Figs. 1 and 2.

Similar letters of reference indicate corresponding parts in both these figures.

A is the main tube, the rear portion of which is bent inward. B is an exterior strengthening-cup, applied as represented. The exterior of the main body A is a little contracted for a length corresponding to the depth of the cup. $B^1$ $B^2$ are interior cups. C C, &c., are stout rivets uniting the several cups with a plane disk, D, which has a diameter somewhat greater than the main body A. Large orifices $b$ are formed in the several strengthening-cups. The disk D has a single central orifice, $d$.

The gun (not represented) is understood to be a breech-loader. It may be of various approved styles; but it is essential that the vent shall be opposite the center of the rear of the cartridge, or that there shall be a channel some way provided by which the fire from the friction-priming or other priming shall be communicated forcibly to that point. When the priming has exploded it acts through the hole $d$, and forces inward the central portion $m$ of the cups B $B^1$ $B^2$, which are opposite thereto, and allows the fire to flash through the joint thus opened into the cartridge and ignite it.

The large holes $b$ not only provide an ample space for the fire to communicate into the cartridge, but also weaken the metal of the cups, so that the center $m$ of the cups can yield inward readily. When the powder within the cartridge ignites, the superior pressure from within forces the central parts $m$ of the cups backward, and causes them to again tightly close the hole $d$, forming an efficient gas-check.

In Figs. 3 and 4 a separate piece is introduced to form the valve $m$. It is secured by stout rivets C. The action is very nearly the same in each form. The details and proportions may be varied within wide limits. It is only essential that the resistance of the disk D to the explosion of the priming shall be considerably greater than that of the valve, and that a free space shall be allowed for the fire from the priming to enter the cartridge, while the valve offers a firm resisting-surface to the backward motion of the gas when the cartridge explodes.

In the form shown in Fig. 5 the raised central portion $m$ of the cup B allows a little space, which is always open for the fire to communicate from the rear through the small holes $b$, into the interior of the cartridge. It is in this respect different from either of the other modifications. This form of the cartridge-case requires that the cavity in the rear of the disk shall be stopped by a cork or other suitable means, to prevent the escape of powder and the entrance of dampness in the transportation or handling of the cartridge.

In preparing to use this form of the cartridge-case the cork G must be removed, and its place may be occupied by a self-primer suitably introduced; or it may be left empty to receive the action of a friction-primer or analogous discharging means. Whatever the source of the fire, the raised center $m$ of the cap B is driven backward by the force of the discharge, when the interior of the cartridge is ignited, and fits tightly over the small hole $d$ in the center of the disk D. It is so weak as to be readily crushed backward by the force of the main discharge, and performs the functions of a valve in covering tightly the hole $d$, and preventing any considerable back flow of gas.

The front ends of the several modifications of the cartridge-case may be closed, to retain the powder and exclude dampness, by any suitable means. In Fig. 1 a cover, E, is shown. Such cover may be of very thin metal, or of a combustible material, as water-proof paper. It is only important that it performs its functions without possessing any sufficient mass to involve risk of injury in firing over the heads of troops.

The invention may be carried out with some success by using a less number of cups B B$^1$, &c., and by putting them all on the inside, or all on the outside.

In Figs. 1 and 3 the turned-in portion of the main body A extends in but a little distance, and is not touched by the rivets C. In Fig. 5 it is shown as extending in farther, and receiving the rivets. The latter is preferable when the material will bear that amount of distortion. To facilitate such form the cases A may be made of soft copper. In such case it may be preferable to draw them in the form of tubes rather than to form them by bending sheet metal.

I propose in another distinct application for patent to claim more broadly the riveted cups B B$^1$, &c. In this application I claim only in connection with the valves formed therein.

I claim as my invention—

A metallic cartridge-case having a valve opening inward, substantially as and for the purposes herein specified.

In testimony whereof I have hereunto set my name in presence of two subscribing witnesses.

B. B. HOTCHKISS.

Witnesses:
CH. F. THIRION,
DAVID T. S. FULLER.